United States Patent
Jean (10) Patent No.: US 9,195,530 B1
(45) Date of Patent: Nov. 24, 2015

(54) SYSTEMS AND METHODS FOR IMPROVED DATA MANAGEMENT IN DATA STORAGE SYSTEMS

(75) Inventor: Sebastien A. Jean, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 117 days.

(21) Appl. No.: 13/226,437

(22) Filed: Sep. 6, 2011

(51) Int. Cl.
*G06F 11/00* (2006.01)
*G06F 11/07* (2006.01)
*G06F 11/16* (2006.01)
*G06F 13/40* (2006.01)

(52) U.S. Cl.
CPC ............ *G06F 11/0727* (2013.01); *G06F 11/16* (2013.01); *G06F 13/4027* (2013.01); *G06F 2201/845* (2013.01)

(58) Field of Classification Search
CPC ............ G06F 12/0804; G06F 13/4027; G06F 2003/0692; G06F 2212/1016; G06F 3/0601; G06F 11/1076; G06F 12/0866; G06F 2211/1009; G06F 11/0727; G06F 2201/845; G06F 11/1666; G06F 11/2097; G06F 3/061; G06F 11/10; G06F 11/1032; G06F 11/16; G06F 11/167; G06F 11/2087; G06F 13/4045; G06F 9/4411
USPC ................................. 711/103, 114
See application file for complete search history.

(56) References Cited

U.S. PATENT DOCUMENTS

| | | | |
|---|---|---|---|
| 6,148,354 A | 11/2000 | Ban et al. | |
| 6,182,248 B1 | 1/2001 | Armstrong et al. | |
| 6,253,271 B1 * | 6/2001 | Ram et al. | 710/306 |
| 6,304,984 B1 | 10/2001 | Neal et al. | |
| 6,519,718 B1 | 2/2003 | Graham et al. | |
| 6,735,661 B2 | 5/2004 | Gelke et al. | |
| 6,785,767 B2 | 8/2004 | Coulson | |
| 6,856,556 B1 | 2/2005 | Hajeck | |
| 6,988,175 B2 | 1/2006 | Lasser | |
| 7,103,684 B2 | 9/2006 | Chen et al. | |
| 7,126,857 B2 | 10/2006 | Hajeck | |
| 7,127,549 B2 | 10/2006 | Sinclair | |
| 7,136,973 B2 | 11/2006 | Sinclair | |
| 7,430,136 B2 | 9/2008 | Merry, Jr. et al. | |
| 7,447,807 B1 | 11/2008 | Merry et al. | |
| 7,460,394 B2 | 12/2008 | Happ et al. | |
| 7,502,256 B2 | 3/2009 | Merry, Jr. et al. | |
| 7,509,441 B1 | 3/2009 | Merry et al. | |

(Continued)

FOREIGN PATENT DOCUMENTS

WO  WO 2011/019596  2/2011

OTHER PUBLICATIONS

U.S. Appl. No. 13/297,082, filed Nov. 15, 2011, to Jean, et al., 28 pages.

(Continued)

*Primary Examiner* — Hashem Farrokh (57) ABSTRACT

A controller-bridge architecture in which a bridge device coupled with the non-volatile memory (NVM) handles inline read-modify-write function under instructions from a controller device is disclosed. In some embodiments, instead of transferring an entire range of data (e.g., a whole NVM page) across a bus between the bridge and the controller twice (once before and once after modification), only the modification data is sent by the controller to the bridge across the bus. The bridge in some embodiments also handles error correction and/or RAID parity striping in the read-modify-write process.

21 Claims, 9 Drawing Sheets

(56) References Cited

U.S. PATENT DOCUMENTS

| | | |
|---|---|---|
| 7,594,135 B2 | 9/2009 | Gonzalez et al. |
| 7,596,643 B2 | 9/2009 | Merry, Jr. et al. |
| 7,623,401 B2 | 11/2009 | Philipp et al. |
| 7,631,245 B2 | 12/2009 | Lasser |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,716,411 B2 | 5/2010 | Panabaker et al. |
| 7,733,712 B1 | 6/2010 | Walston et al. |
| 7,765,373 B1 | 7/2010 | Merry et al. |
| 7,861,038 B2 | 12/2010 | Fontenot et al. |
| 7,861,122 B2 | 12/2010 | Cornwell et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,957,173 B2 | 6/2011 | Kim |
| 7,962,777 B2 | 6/2011 | Gonzalez et al. |
| 7,962,792 B2 | 6/2011 | Diggs et al. |
| 7,970,978 B2 | 6/2011 | Luo et al. |
| 8,065,304 B2 | 11/2011 | Ross |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,120,969 B1 | 2/2012 | Montierth et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,291,295 B2 | 10/2012 | Harari et al. |
| 8,296,625 B2 | 10/2012 | Diggs et al. |
| 8,312,207 B2 | 11/2012 | Merry, Jr. et al. |
| 8,315,092 B2 | 11/2012 | Strasser et al. |
| 8,316,176 B1 | 11/2012 | Phan et al. |
| 8,341,339 B1 | 12/2012 | Boyle et al. |
| 8,341,374 B2 | 12/2012 | Kwon et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,443,263 B2 | 5/2013 | Selinger et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2002/0053010 A1* | 5/2002 | Piccirillo et al. ............... 711/170 |
| 2003/0165076 A1 | 9/2003 | Gorobets et al. |
| 2003/0172261 A1 | 9/2003 | Lee et al. |
| 2005/0160217 A1 | 7/2005 | Gonzalez et al. |
| 2005/0223373 A1 | 10/2005 | Gage et al. |
| 2005/0251617 A1 | 11/2005 | Sinclair et al. |
| 2006/0248387 A1 | 11/2006 | Nicholson et al. |
| 2007/0038901 A1 | 2/2007 | Shiota et al. |
| 2007/0180328 A1 | 8/2007 | Cornwell et al. |
| 2007/0190328 A1 | 8/2007 | Cowburn et al. |
| 2007/0220202 A1 | 9/2007 | Sutardja et al. |
| 2007/0245092 A1 | 10/2007 | Yeh |
| 2007/0288683 A1 | 12/2007 | Panabaker et al. |
| 2007/0288692 A1 | 12/2007 | Bruce et al. |
| 2008/0040531 A1 | 2/2008 | Anderson |
| 2008/0192928 A1 | 8/2008 | Yu et al. |
| 2008/0215808 A1* | 9/2008 | Ashmore et al. ............... 711/113 |
| 2008/0250270 A1 | 10/2008 | Bennett |
| 2009/0013233 A1 | 1/2009 | Radke |
| 2009/0024793 A1 | 1/2009 | Fontenot et al. |
| 2009/0037652 A1 | 2/2009 | Yu et al. |
| 2009/0063730 A1* | 3/2009 | Gower et al. ................... 710/35 |
| 2009/0158124 A1 | 6/2009 | Kawai et al. |
| 2009/0172257 A1 | 7/2009 | Prins et al. |
| 2009/0240873 A1 | 9/2009 | Yu et al. |
| 2009/0282305 A1 | 11/2009 | Chen et al. |
| 2009/0313411 A1 | 12/2009 | Stenfort |
| 2010/0023800 A1 | 1/2010 | Harari et al. |
| 2010/0037012 A1 | 2/2010 | Yano et al. |
| 2010/0088459 A1 | 4/2010 | Arya et al. |
| 2010/0100675 A1 | 4/2010 | Furuhjelm |
| 2010/0122022 A1 | 5/2010 | Luo et al. |
| 2010/0174849 A1 | 7/2010 | Walston et al. |
| 2010/0174851 A1 | 7/2010 | Leibowitz et al. |
| 2010/0180182 A1 | 7/2010 | Trantham |
| 2010/0205517 A1 | 8/2010 | Lee et al. |
| 2010/0217924 A1 | 8/2010 | Panabaker et al. |
| 2010/0250793 A1 | 9/2010 | Syu |
| 2010/0268874 A1 | 10/2010 | Pyeon |
| 2010/0281342 A1 | 11/2010 | Chang et al. |
| 2010/0325352 A1 | 12/2010 | Schuette et al. |
| 2010/0327923 A1 | 12/2010 | Pyeon et al. |
| 2011/0010491 A1 | 1/2011 | Anderson |
| 2011/0035540 A1 | 2/2011 | Fitzgerald et al. |
| 2011/0040924 A1 | 2/2011 | Selinger |
| 2011/0041039 A1 | 2/2011 | Harari et al. |
| 2011/0082985 A1 | 4/2011 | Haines et al. |
| 2011/0099323 A1 | 4/2011 | Syu |
| 2011/0107076 A1 | 5/2011 | Kim et al. |
| 2011/0119442 A1 | 5/2011 | Haines et al. |
| 2011/0138112 A1 | 6/2011 | Chiang et al. |
| 2011/0145489 A1 | 6/2011 | Yu et al. |
| 2011/0238885 A1* | 9/2011 | Kitahara et al. ............... 711/103 |
| 2011/0283049 A1 | 11/2011 | Kang et al. |
| 2011/0283135 A1 | 11/2011 | Burger et al. |
| 2011/0289267 A1* | 11/2011 | Flynn et al. ................... 711/103 |
| 2011/0320915 A1* | 12/2011 | Khan ............................ 714/773 |
| 2012/0102263 A1 | 4/2012 | Aswadhati |
| 2012/0131268 A1 | 5/2012 | Anderson |
| 2012/0203951 A1 | 8/2012 | Wood et al. |
| 2012/0221922 A1 | 8/2012 | Bennett |
| 2012/0233380 A1* | 9/2012 | Butterfield ................... 711/103 |
| 2012/0260020 A1 | 10/2012 | Suryabudi et al. |
| 2012/0265926 A1 | 10/2012 | Tal et al. |
| 2012/0278531 A1 | 11/2012 | Horn |
| 2012/0284460 A1 | 11/2012 | Guda |
| 2012/0324191 A1 | 12/2012 | Strange et al. |
| 2013/0060981 A1 | 3/2013 | Horn et al. |

(56) References Cited

U.S. PATENT DOCUMENTS

| | | |
|---|---|---|
| 2013/0073785 A1 | 3/2013 | Emma et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

U.S. Appl. No. 13/297,163, filed Nov. 15, 2011, to Jean, et al., 41 pages.
U.S. Appl. No. 13/430,447, filed Mar. 26, 2012, to Horn, et al., 43 pages.

\* cited by examiner

SYSTEMS AND METHODS FOR IMPROVED DATA MANAGEMENT IN DATA STORAGE SYSTEMS

BACKGROUND

1. Technical Field

This disclosure relates to non-volatile storage systems, including but not limited to flash drives. More particularly, the disclosure relates to systems and methods for improved data management in solid state drives.

2. Description of the Related Art

Data access operations in flash media in solid state drives (SSD) are typically performed at the page level. For example, reading and writing are typically performed by page but erasing is performed by block. Unlike hard disk drives (HDD), where a small portion (e.g., a sector) can be directly modified, data within an individual page in the flash media cannot be directly modified. Typically, to perform a "read-modify-write" function, a SSD controller needs to read out the entire page into a temporary memory buffer, modify the contents of the page, and write the modified page back to the flash.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

I. System Overview

Many existing flash controllers do not support an inline read-modify-write function. For example, to modify a small portion of a page in non-volatile memory (NVM), the whole page is read out from the NVM and back to the controller, where it is modified in volatile memory such as DRAM and then sent back to the NVM to be programmed. This introduces significant latency. In contrast, embodiments of the invention provide a controller-bridge architecture in which a bridge device is coupled with the NVM and handles the modification step under instruction from a controller device. In one embodiment, instead of transferring the entire range of data (e.g., the whole page) across the bus between the bridge and the controller twice (once before and once after modification), the modification data is sent by the controller to the bridge across the bus. The bridge in one embodiment also handles error correction and/or RAID parity striping in the read-modify-write process.

Figure 1A:
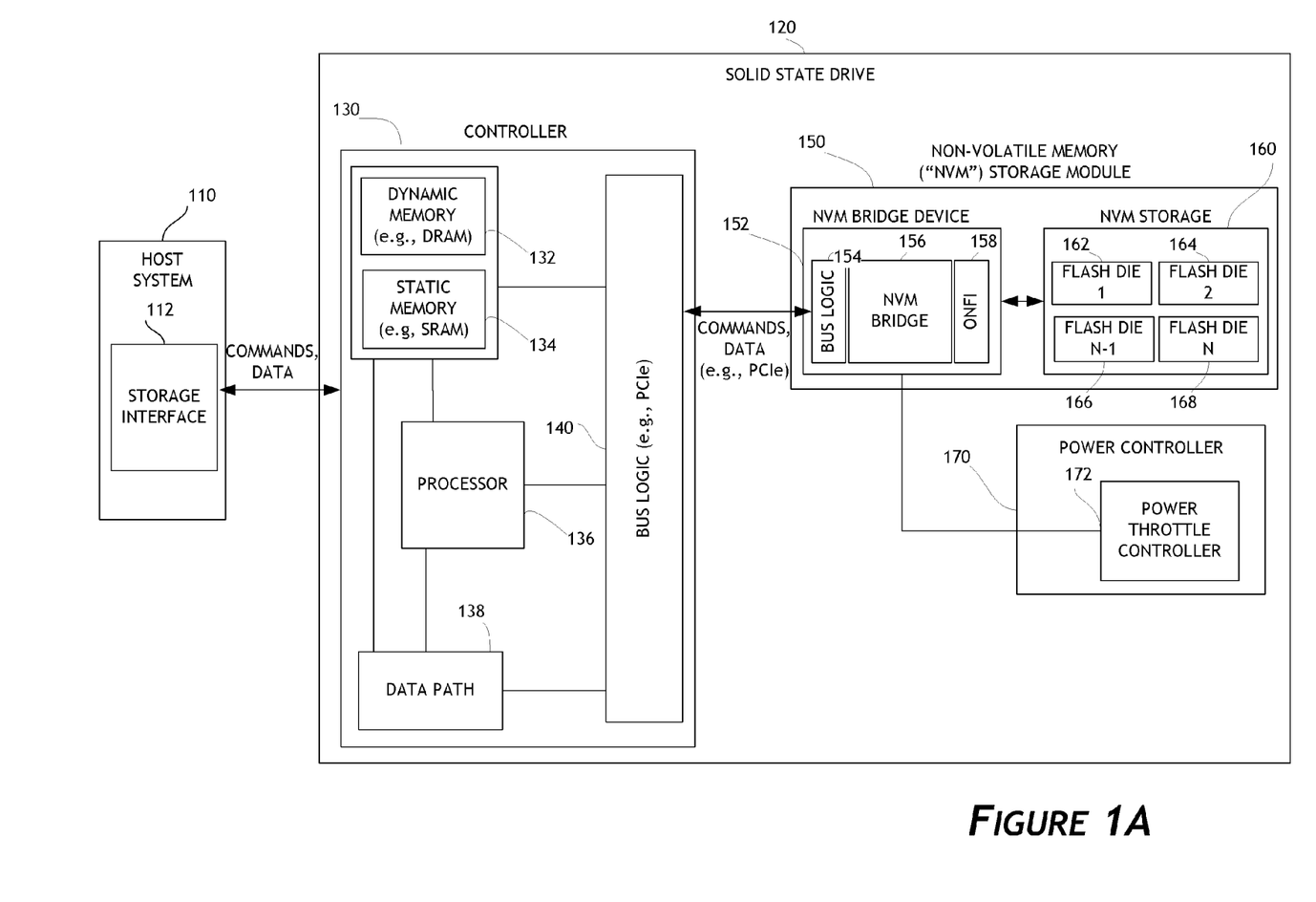
FIGS. 1A and 1B are block diagrams showing the controller architecture according to some embodiments.

FIG. 1A shows a controller-bridge architecture in accordance with some embodiments. This is one example architecture in which the read-modify-write process can be implemented. Those skilled in the art will recognize that other equivalent or similar setups can be used. For example, while the description below discusses standardized interfaces such as PCIe and ONFI, other similar standardized and/or proprietary interfaces can be used and/be adapted for this purpose. Also, while the example architecture below includes details related to various portions to the architecture, they should not be construed as being required and may be omitted in some embodiments. For example, in some embodiments the read-modify-write mechanisms may be implemented without the various queuing mechanisms.

As shown, a solid-state non-volatile storage system 120 is connected to a host system 110. The host system 110 communicates with the non-volatile storage system 120 using a storage interface 112. The host's storage interface 112 can communicate with the non-volatile storage system 120 using any known communication protocol, such as SATA, SCSI, SAS, USB, Fibre Channel, PCIe, eMMC, etc.

In one embodiment, the non-volatile storage system 120 includes a controller 130 and a NVM storage module 150. The controller 130 in one embodiment communicates with a bridge device 152 within the NVM storage module 150 via a high level interface such as PCIe (through bus logic/interface 140). PCIe is used in one embodiment as it defines a rich packet based routing and Quality of Service (QoS) infrastructure and provides a high speed interface. The controller may include a processor 136 to control data functions, and the core may be coupled with static memory 132 and dynamic memory 134. The controller 130 may also include a data path 138 for processing/transferring data related to data access commands from the host system 110. In one embodiment, the controller 130 is implemented on a SoC (System on Chip), though those skilled in the art will recognize that other hardware/firmware implementations are possible.

In one embodiment, the use of PCIe means that the address range assigned to a device function is used for packet routing both on the fabric and within the device. In one embodiment, the PCIe transaction layer delivers packets to an internal register interface that is read by firmware. Advanced devices often direct incoming packets to internal RAM or hardware acceleration modules.

The bridge device 152 in one embodiment comprises bus logic/interface 154 for communicating with the bus logic/interface 140 (on the controller 130) over the high level interface bus. On the other end of the bridge, the bridge device 152 includes a low level interface 158 such as ONFI for communicating with the NVM storage 160 (e.g., NAND), which may include a number of storage devices such as flash dies 162, 164, 166, and 168. Although ONFI is depicted in this embodiment, other suitable flash memory interfaces may be used. In another embodiment, the bridge may use a different interface such as Toggle or a proprietary interface to communicate with the NVM storage 160, or send direct commands to the storage.

I.A. Division of Labor

The advantages of dividing the NVM management functions were outlined above in Section I. In particular, the architecture reduces latency and addresses the various design constraints while allowing the controller and bridge designers to optimize their respective portions of the architecture. In one embodiment, the controller is responsible for block level management, parity stripe layout, garbage collection, wear leveling, handling read disturb and error recovery. The bridge device, in one embodiment, manages the raw NVM flash interface. It may also provide one or more of: command queuing, error correction, XOR parity accumulator, data protection and enhances block endurance. The interface between the bridge and the controller in one embodiment is a light-weight PCIe-based data and management interface. The controller uses the interface control command to configure the bridge and data commands to access the NVM media.

In one embodiment, the bridge includes a XOR parity accumulator that is managed by the controller, which makes the data path simpler in the controller. The controller manages the XOR parity accumulator through XOR parity accumulator commands. In one embodiment, the controller issues common control operation instructions/commands (e.g., embedded within read and write commands) such as: (1) clear before accumulate (operation: read, write), (2) accumulate parity in a buffer (operation: read, write), (3) write a parity buffer to a page in NAND (operation: write). In one embodiment, the instructions/commands are communicated in three bits in the data access command fields. To keep command size down, dedicated commands may be used for less common XOR parity accumulator operations such as: load a parity buffer from a page in NAND, read a parity buffer over the bus, load a parity buffer over the bus, and reset all the parity buffers.

It is also noted that the controller uses physical page addressing instead of a logical one that is common in existing controller-bridge design. The bridge can identify the relationship between pages, blocks, planes, and dies. This gives the controller the greatest flexibility for creating RAID stripe layout, performing data moves, and handling bad blocks. These details are abstracted from the bridge. When using direct addressing, the controller simply provides a set of direct page addresses in the command header to the bridge. In one embodiment, the pages are not necessarily sequential or even in the same block. In most cases, the controller will access pages spread across multiple planes and multiple dies in order to maximize concurrent hardware access. Additional details related to the above described controller architecture can be found in application Ser. No. 13/226,393, entitled "SYSTEMS AND METHODS FOR AN ENHANCED CONTROLLER ARCHITECTURE IN DATA STORAGE SYSTEMS," filed Sep. 6, 2011, and issued as U.S. Pat. No. 8,700,834, the disclosure of which is hereby incorporated by reference.

I.B. Hybrid Application

Figure 1B:
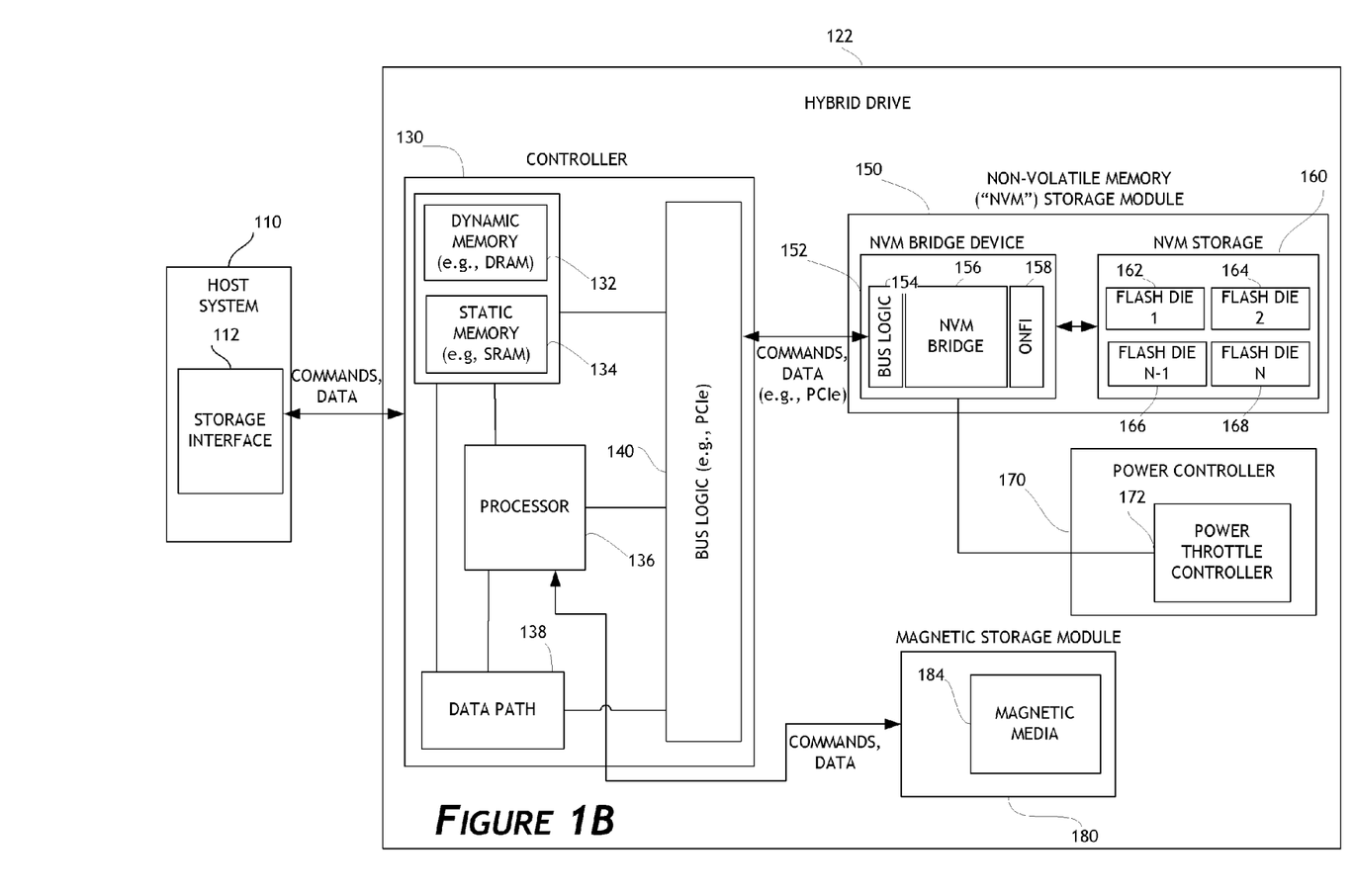

Some embodiments of the controller-bridge architecture can be adapted for other uses. For example, FIG. 1B shows the use of the controller architecture in a hybrid drive 122, which in addition to the NVM and bridge components described above, includes a magnetic storage module 180 which has a magnetic media 184 such as a rotating hard disk drive (HDD). The controller 130 in this embodiment would thus manage data accesses to both the NVM storage module 150 and magnetic storage module 180. In one embodiment, a different interface than interface 140 (which connects to the NVM) may be used to connect the controller 130 to the magnetic storage module 180.

The hybrid application illustrates an additional advantage of the controller architecture. A hybrid drive typically includes an SSD that has its own internal controller that has a mapping table to address the NVM within the SSD. While the HDD portion of the hybrid is typically addressed directly, the hybrid controller uses a special mapping table to determine whether data is in the SSD or the HDD. The use of this special mapping table along with the internal SSD mapping table introduces duplicate overhead in cases where data is accessed in the SSD portion of the hybrid, since there are two mapping tables and there is significant cost associated with maintaining each table.

In contrast, because the controller 130 in the present architecture manages the NVM at both the block and page levels and the magnetic media, it can provide uniformed address management across the flash and magnetic media in a single location. Hence there is no need to have the two tables noted above. This has the advantages of reducing duplicative table lookups and all the associated costs/complexities related to maintaining separate mapping tables. Direct page addressing is used in the unified mapping scheme.

In addition, in a hybrid application, the NVM could still provide effective performance enhancement even when it has a large amount of bad blocks (e.g., 50%). In one hybrid embodiment, the controller also has efficient address gap handling capability (on gaps caused by the bad blocks). In an alternative hybrid embodiment, the unified addressing scheme does not necessarily require a bridge to work with the controller. The controller can potentially use a raw NVM interface (e.g., ONFI) to access the NVM.

II. Data Command Processing

Figure 2:
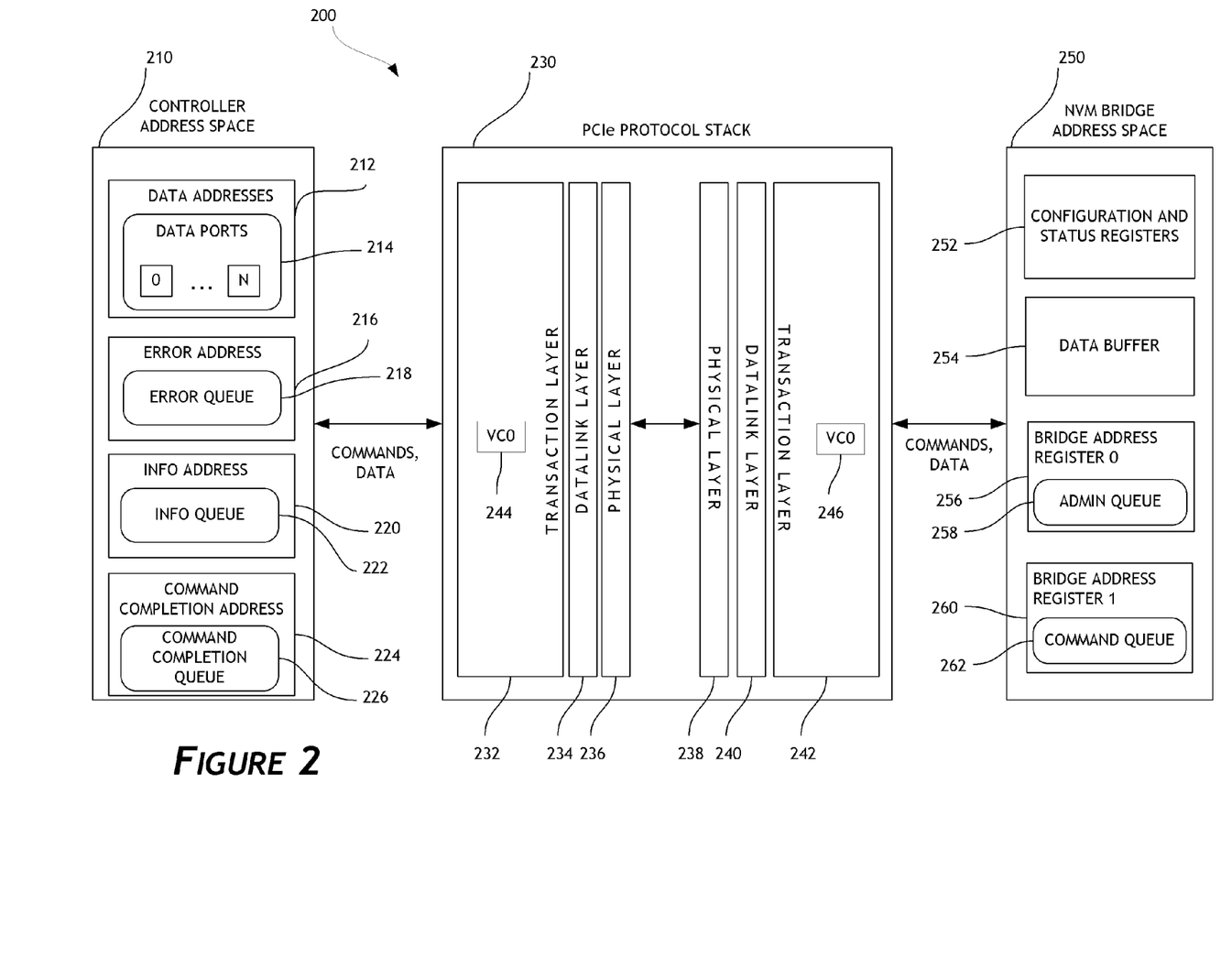
FIG. 2 is a block diagram illustrating the command processing components between the controller and the bridge device according to one embodiment.

FIG. 2 is a block diagram illustrating the command processing components between the controller and the bridge device according to one embodiment. Using the construct of the PCIe interface (or other equivalent interfaces), both the controller and the bridge implement its own address spaces (210, 250) in their respective device memories that can be addressed by the other device. Messages are communicated by writing to queues located within certain addresses within the address spaces, and the addresses are stored in the configuration and status registers 252 in one embodiment. The use of individual queues to handle data access commands and communications between the controller and the bridge will be further described below.

II.A. Command and Admin Queues—Bridge

In one embodiment, the controller sends data access commands to a command queue 262 in the bridge device. This is performed by the controller sending data command messages to the bridge (by writing to the command queue BAR (base address register)). In one embodiment, the command queue has room for sixteen messages, though the number of messages can vary in other embodiments. The command queue can be implemented in a number of ways. One option is full hardware automation where the controller simply writes to a fixed offset. Alternately it can be implemented in memory using a ring buffer or an array based linked list. In one embodiment, the implementation must allow for efficient insertion and notification with minimal bus traffic. In one embodiment, the controller knows the current queue depth based on the number of status responses the bridge has sent back (e.g., a message to the controller's completion queue indicating completion of a command). Note that the data commands are much smaller than the actual data. A given record slot in the queue is considered available once the bridge sends back a completion status or an error report.

In the embodiment shown in FIG. 2, the bridge side 250 also implements configuration and status registers (CSR) 252, along with an admin queue 258 for receiving, from the controller, command messages related to operation of the command queue (e.g., a message for pausing the command queue) or administrative messages concerning the bridge's operation in general. The admin queue 258 may be implemented in a fashion that is similar to the command queue, such as through full hardware automation or ring buffer. Also, like the command queue, the admin queue may be configured for efficient insertion and notification with minimal bus traffic. Like the command queue, the controller can derive the current queue depth and available slots based on responses from the bridge.

II.B. Status Queues—Controller

On the controller side 210 are a set of data ports 214 at data addresses 212 and a number of status queues. In one embodiment, the status queues include an error queue 218, an information queue 222, and a command completion queue 226. These queues are responsible for receiving messages from the bridge regarding command processing, as well as current status of the bridge and the NVM. In one embodiment, the controller implements three status queues to simplify command transactions. The bridge uses the completion queue 226 to indicate when it has successfully completed one or more commands. The info queue 222 is used for non-critical information such as health reports. The error queue 218 allows the bridge to send detailed reports when one or more command fails. Those skilled in the art will recognize that the three queues could be combined into fewer queues or divided into additional queues. Alternatively, in lieu of these queues, the controller and the bridge may use an interrupt based system whereby the bridge would send an interrupt when it wishes to communicate with the controller. The controller may then check a message stored on the bridge side.

II.C. Communications Between the Controller and the Bridge

Communications between the controller and the bridge are effected in one embodiment through a PCIe protocol stack 230 which includes a number of layers on both sides, including a transactional layer (232, 242), a data link layer (234, 240), and physical layer (236, 238). While PCIe is used in this disclosure to illustrate the operation of the controller and the bridge, other similar standards can be used as well.

The PCIe transaction layer assigns transmit credits based on how much room is left in its Virtual Channel (VC) buffer space. According to the PCIe specification, devices must implement VC0, though some devices implement additional VC to ensure high priority messages have dedicated resources. Packets are directed to the appropriated VC based on their Traffic Class (TC). The TC is also used to determine priority when packets are flowing over the PCIe fabric. Higher TC packets are generally given priority by the root complex, switches and end-devices.

In one embodiment, the controller is designed to operate using only VC0. In one embodiment, though the bridge may implement additional VC, it must be configurable so that it can operate in single VC mode. The messages communicated between the controller and the bridge will be better understood in view of the following brief description of the data processing flow. To service a read command from the host, the controller may first send a command message to the bridge's command queue. Once the bridge processes the command message, it will read the requested data from the NVM and send the read data back to a corresponding data port on the controller side. This action triggers the data path on the controller, which leads to the data being sent back to the host. Conversely, to service a write command from the host, the controller may first send a command message to the bridge's command queue. Once the bridge processes the command message, it will read from a corresponding data port on the controller side. This action triggers the data path on the controller, which leads to the write data being sent from a buffer in the controller to the bridge for writing to the NVM.

The controller in one embodiment communicates with the bridge using three message types of increasing priority: data to be written to the NVM for write commands (0), messages for the bridge's command queue (1), and messages for the bridge's admin queue (2). Those skilled in the art will recognize that different priorities may be assigned to these messages, and the messages could be combined into fewer types or divided into more types depending on the implementation. In one embodiment, under normal conditions, the controller sends a steady stream of data packets to the bridge.

In one embodiment, the bridge interacts with the controller using its own set of prioritized message types (listed here in increasing priority): data read from the NVM for read commands (0), messages for the controller's completion/info queues (1), and messages for the controller's error queue (2). Those skilled in the art will recognize that different priorities may be assigned to these messages, and the messages could be combined into fewer types or divided into more types depending on the implementation. As will be further described below, to facilitate fast processing of data access commands, a read or write by the bridge to a data port in the controller automatically triggers the data path in the controller. In one embodiment, it is not uncommon for the bridge to process several commands in parallel. In one embodiment, the bridge uses the completion queue 226 to notify the controller when commands have completed successfully. In additional, non-critical messages are sent to the info queue 222 while detailed error reports are sent to the error queue 218. In other embodiments, these queues may be combined into fewer queues (with different message types being distinguished by special flags or implied address values) or separated into more queues (e.g., different error queues for different types of error or different info queues for different types of information returned from the bridge).

In other embodiments where a different interface than PCIe is used, the PCIe protocol stack may be replaced with the appropriate stacks/layers of that interface. Those skilled in the art will recognized that other equivalent standardized interfaces (e.g., eMMC) may be adapted to replace PCIe. In other embodiments, a custom/proprietary interface may be used to handle communications between the controller and the bridge.

III. Read-Modify-Write Processing

Figure 3:
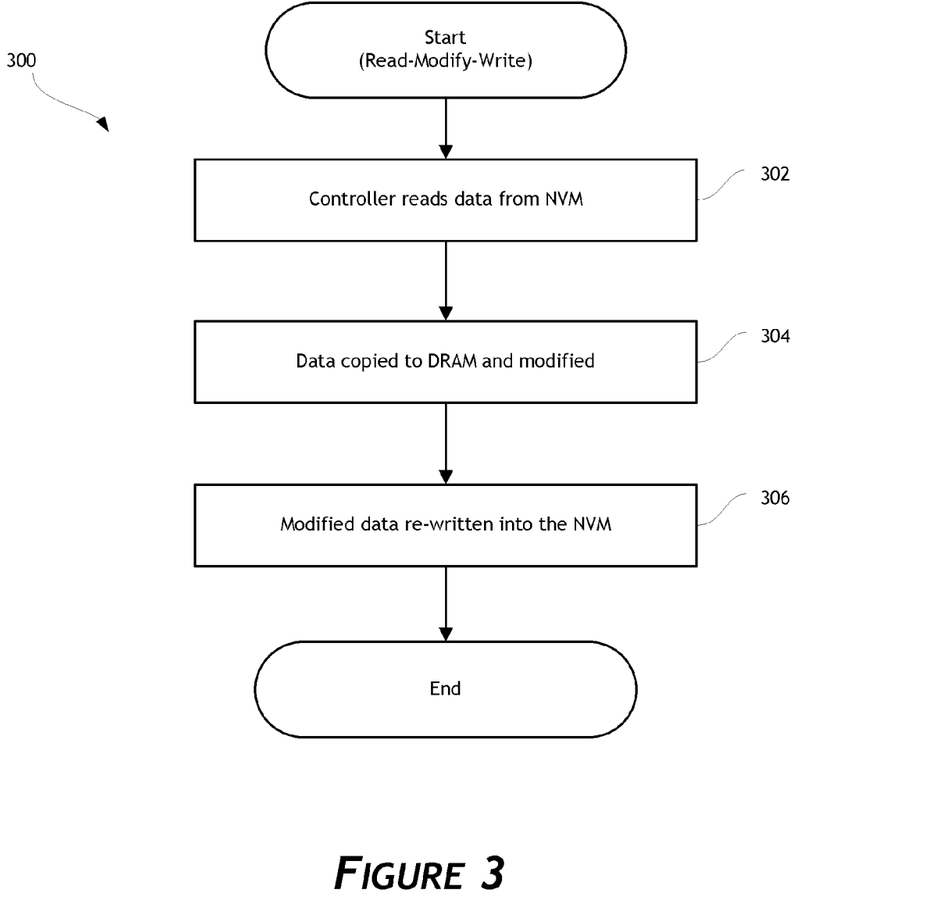
FIG. 3 is a flow diagram showing a common "read-modify-write" data processing sequence.

FIG. 3 is a flow chart showing a common "read-modify-write" data processing sequence 300. In this typical setup, a SSD controller would read data from the NVM at block 302. The data is copied to the DRAM (or other volatile memory) at block 304 so the controller can modify the data. Once the modification is complete, the modified data is re-written to the NVM 306.

Figure 4:
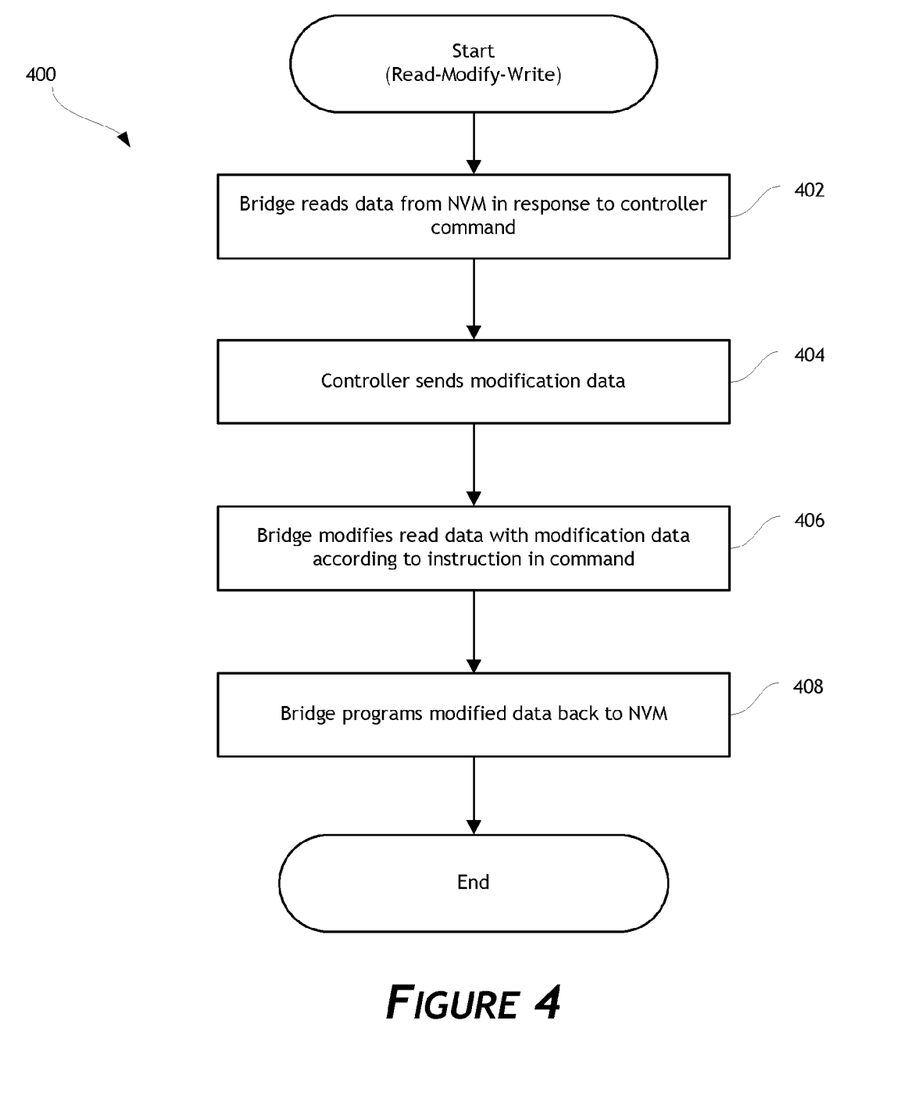
FIG. 4 is a flow diagram showing a "read-modify-write" data processing sequence according to one embodiment.

FIG. 4 is a flow chart showing a "read-modify-write" data processing sequence 400 according to one embodiment. The flow chart shows the interaction between the controller and the bridge described above. The bridge reads data from the NVM at block 402 in response to a command from the controller. In one embodiment, the command includes an address location from which the original data is to be read and/or an address location to which the modified data is to be written. The command may also include instruction which may include an opcode with an offset specifying an offset location at which the modification data is to be inserted into the original data. In another embodiment, the instruction may specify multiple locations at which the modification data are to be inserted. In addition, if the bridge also handles RAID parity striping (as will be further described below), the command may also include an address location of the original parity and an address location at which the updated parity should be stored.

Returning to FIG. 4, in block 404, instead of having the bridge send the read data across the bus to the controller, the controller sends modification data to the bridge. In another embodiment, the order of blocks 402 and 404 may be reversed, so that the modification data may be sent by the controller to the bridge before the bridge reads the original data from the NVM. This could be implemented if, for example, in place of the implied command/data path trigger embodiment described above, the controller implements a push-model in which data is pushed to the bridge when the controller sends a command to the bridge. Regardless of the order, based on the command, the bridge modifies the read data in block 406 and programs the modified data back to the NVM in block 408.

Figure 5:
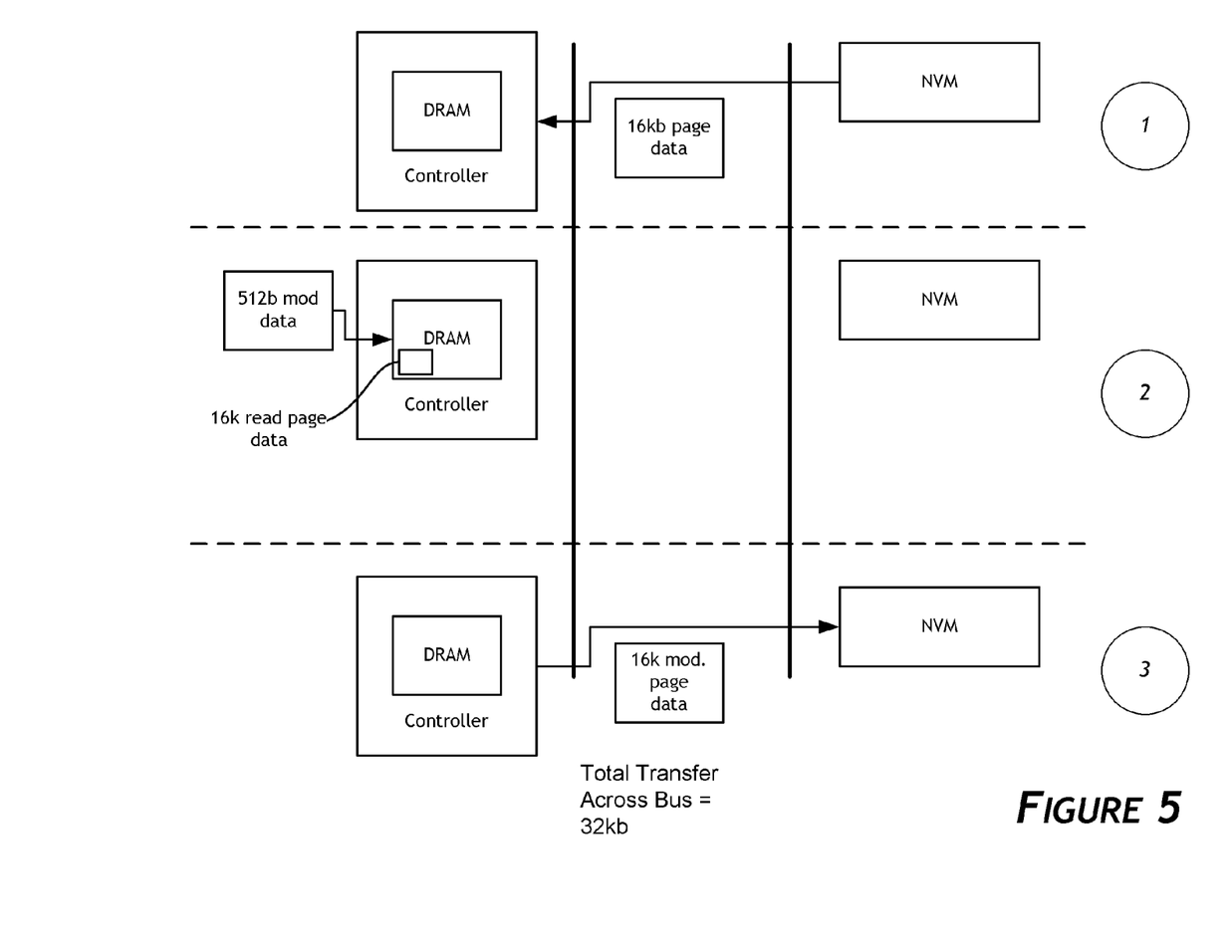
FIG. 5 is block diagram that illustrates a "read-modify-write" data processing sequence that is commonly performed.

FIG. 5 is block diagram that illustrates a "read-modify-write" data processing sequence that is commonly performed. FIG. 5 includes three sub-diagrams each illustrating a stage in the sequence. In sub-diagram 1, which shows a first stage, 16 kb of data (e.g., a page) is being transferred, across the bus, from the NVM to the controller in response to a read command. In sub-diagram 2, which shows second stage, the controller modifies the read data with 512b of modification data. The modification operation may take place in volatile memory such as DRAM. Then in stage 3 (shown in sub-diagram 3), the modified data is sent back across the bus to the NVM to be written. Based on this scenario, a total of 32 kb of data is transferred across the bus for a 512b modification.

Figure 6:
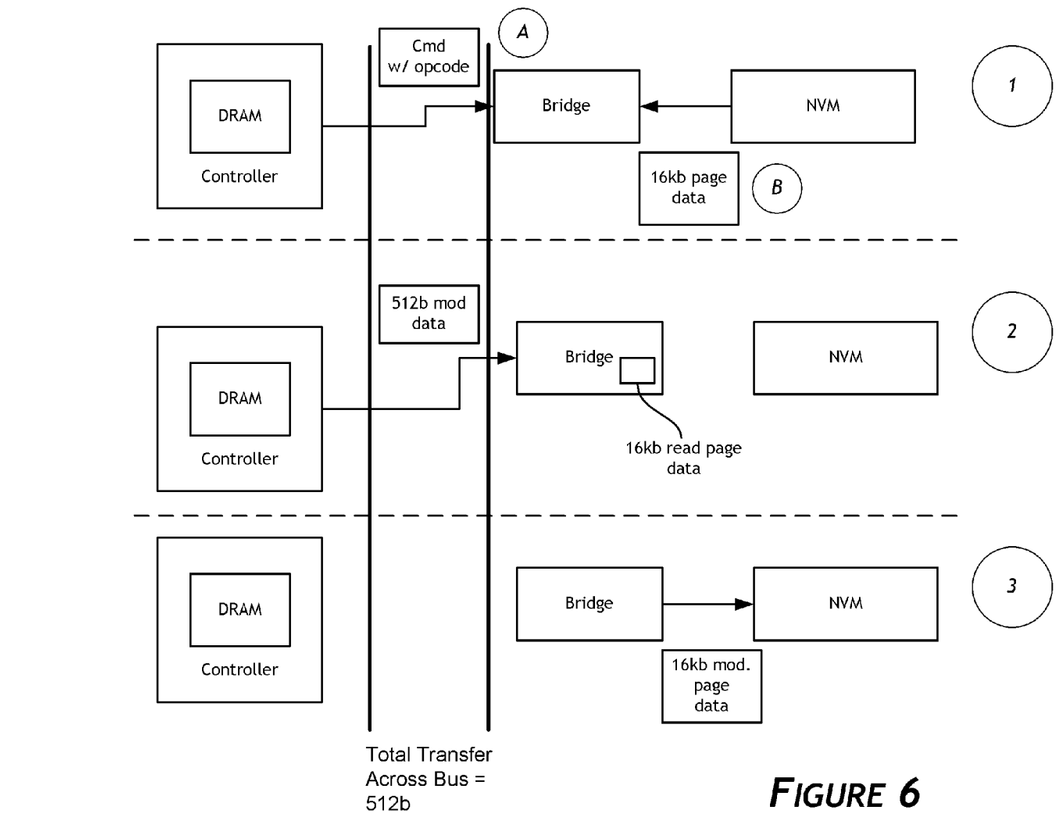
FIG. 6 is a block diagram that illustrates a reduced amount of data transfer over a bus based on the "read-modify-write" data processing sequence according to one embodiment.

FIG. 6 is a block diagram that illustrates a reduced amount of data transfer over a bus based on the "read-modify-write" data processing sequence according to one embodiment. Like FIG. 5, FIG. 6 includes three sub-diagrams each illustrating a stage in the sequence. In sub-diagram 1, which shows a first stage, two actions are shown. Action "A" shows a read-modify-write command sent from the controller to the bridge. The command may include insertion instruction as discussed above. In action "B," 16 kb of data (e.g., a page) is read from the NVM into the bridge in response to the read-modify-write command from the controller. However, the data is not transferred across the bus. In sub-diagram 2, which shows second stage, the controller sends 512b of modification data to the bridge. According to one embodiment, it is the bridge, not the controller, which performs the data modification operation. In this case, the bridge modifies the 16 kb of read data with the 512b of modification data, based on instruction within the read-modify-write command. Then in stage 3 (shown in sub-diagram 3), the modified data is written to the NVM. Based on this scenario, a total of 512 kb of data is transferred across the bus. This greatly reduces latency compared to the implementation shown in FIG. 5.

Figure 7:
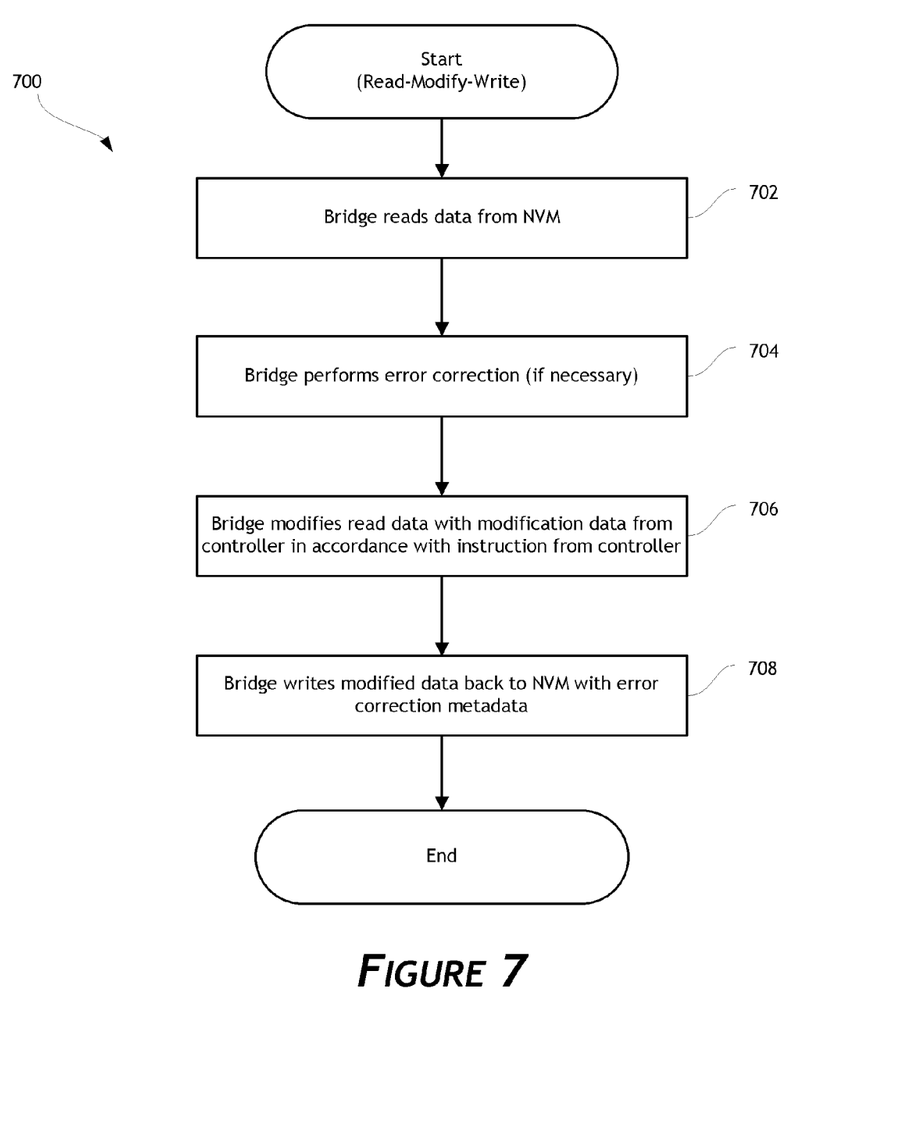
FIG. 7 shows an additional error correction function that may be performed by the bridge device in one embodiment.

FIG. 7 shows the additional error correction function that may be performed by the bridge device in one embodiment. In addition to performing the read-modify-write operation as described above, the bridge may additionally perform an error correction function on the read data and encode the modified data with error correction metadata. As shown in FIG. 7, the bridge begins the process by reading data from the NVM in block 702. Then in block 704, the bridge performs error correction on the read data if necessary. In block 706, the bridge modifies the read data with the modification data from the controller in accordance with the instruction from the controller. In block 708, the bridge writes the modified data back to the NVM with the error correction metadata. In one embodiment, ECC is the error correction performed. Those skilled in art will recognize that other error correction methods may also be used. In other embodiments, the process shown in FIG. 7 may be modified to decode/encode of any metadata as data is read from and written to the NVM. In some embodiments, the decoding and encoding may be performed in addition to, or in place of, the error correction mechanism described above.

Figure 8:
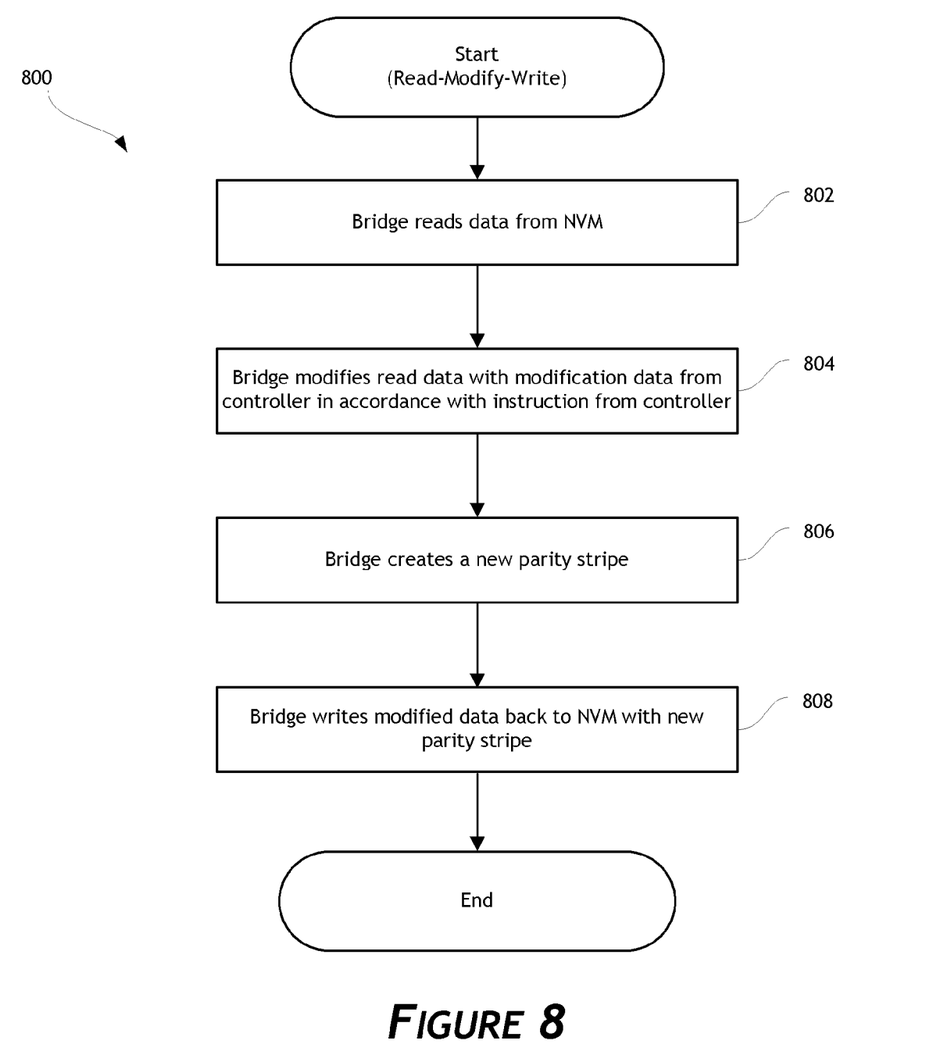
FIG. 8 shows an additional RAID striping function that may be performed by the bridge device in one embodiment.

FIG. 8 shows a RAID striping function that may be performed by the bridge device in one embodiment. In addition to performing the read-modify-write operation as described above, the bridge may additionally handle parity striping where a RAID striping scheme is implemented. As shown in FIG. 8, the bridge begins the process by reading data from the NVM in block 802. The data may be in an NVM with a RAID striping scheme. The scheme is primarily maintained by the controller in one embodiment, in accordance with the controller/bridge division of labor description provided in Sections I and II. Then in block 804, the bridge modifies the read data with the modification data from the controller in accordance with the instruction from the controller. In block 806, the bridge creates a new RAID parity stripe since the old parity stripe was created based on data before the modification. For example, where the parity stripe is based on an XOR operation, the old stripe can be removed by an XOR operation and the new stripe can be created by another XOR operation. In block 808, the bridge writes the modified data and the new parity stripe to the NVM.

The inline handling of a read-modify-write with parity striping achieves an even greater improvement in terms of latency. Because the creation of the parity stripe is handled by the bridge, there is no need to transfer the parity stripe across the bus twice. Going by the 16 kb page example in FIG. 6, with the bridge handling the parity striping post modification would further save an additional 32 kb of data (2× stripe page) from being transferred across the bus.

Although this disclosure uses RAID as an example, the systems and methods described herein are not limited to the RAID redundancy schemes and can be used in any data redundancy configuration that utilizes striping and/or grouping of storage elements for mirroring or error checking purposes. In addition, although RAID is an acronym for Redundant Array of Independent Disks, those skilled in art will appreciate that RAID is not limited to storage devices with physical disks and is applicable to a wide variety of storage devices including the non-volatile solid state devices described herein.

IV. Alternative Embodiments: Conclusion

As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of some embodiments of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, the various components illustrated in FIGS. 1A, 1B, and 2 may be implemented as software and/or firmware on a processor, ASIC/FPGA, or dedicated hardware. For example, those skilled in the art will appreciate that in some embodiments, the actual steps taken in the processes shown in FIGS. 4, 6, 7, and 8 may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for reducing data latency for a read-modify-write operation in a controller architecture comprising a controller device and a bridge device coupled with non-volatile solid-state memory storage, the method comprising performing by the bridge device:

in response to receiving, from the controller device, a first command comprising modification data and a first location of parity data in the non-volatile memory storage and a second command instructing the bridge device to accumulate parity data in connection with processing the first command:

reading data from the non-volatile memory storage, wherein reading the data comprises performing error correction in response to detecting an error in the data;

modifying the read data with the modification data to generate modified data;

creating updated parity data based at least in part on the modification data and parity data stored at least partially in the first location, wherein creating the updated parity data is performed by the bridge device without transferring the parity data and the updated parity data to the controller device;

writing the modified data to the non-volatile memory storage; and writing the updated parity data to the non-volatile memory storage without receiving an additional command from the controller device, the additional command directing the bridge device to write the updated parity data, whereby latency is reduced due to performance of the read-modify-write operation without transfer of the read data from the bridge device to the controller device.

2. The method of claim 1, wherein the controller device is provided page level access to the non-volatile memory storage through the bridge device and wherein the controller device and the bridge device communicate via an interface.

3. The method of claim 2, wherein the interface is PCIe.

4. The method of claim 1, wherein writing the modified data comprises writing error correction metadata with the modified data.

5. The method of claim 1, wherein data in the non-volatile memory storage is stored in a data redundancy scheme and the reading and writing are performed in accordance with the data redundancy scheme.

6. The method of claim 5, wherein the first command further comprises a second location in the non-volatile memory storage for storing at least a part of updated parity data, and wherein updated parity data is written at least partially to the second location.

7. The method of claim 1, wherein the size of the modification data is substantially smaller than the size of the read data.

8. The method of claim 1, wherein the first command specifies a plurality of modification data units and a plurality of locations at which the plurality of modification data units are to be inserted into the read data.

9. The method of claim 1, wherein creating the updated parity data comprises performing error correction in response to detecting an error in reading the parity data.

10. The method of claim 1, wherein the first command is different from the second command.

11. A non-volatile storage module for reducing data latency for a read-modify-write operation, the module comprising:

non-volatile solid-state memory storage;

a controller device configured to store and access data in the non-volatile memory storage; and a bridge device coupled with the non-volatile memory storage through a first interface and coupled to the controller through a second interface;

wherein the bridge device is configured to:

receive a read-modify-write command from the controller device via the second interface, the command comprising modification data and a first location of parity data in the non-volatile memory storage;

receive from the controller device via the second interface a parity accumulation command instructing the bridge device to accumulate parity data in connection with processing the read-modify-write command; and in response to receiving the read-modify-write command and the parity accumulation command:

read data from the non-volatile memory storage, wherein the bridge device is configured to perform error correction in response to detecting an error in the data;

modify the read data with the modification data to generate modified data;

create updated parity data based at least in part on the modification data and the parity data stored at least partially in the first location, wherein the bridge device is configured to create the updated parity data without transferring the parity data and the updated parity data to the controller device;

write the modified data to the non-volatile memory storage; and write the updated parity data to the non-volatile memory storage without receiving an additional command from the controller device, the additional command directing the bridge device to write the updated parity data.

12. The non-volatile storage module of claim 11, wherein the read-modify-write command specifies a plurality of modification data units and a plurality of locations at which the plurality of modification data units are to be inserted into the read data.

13. The non-volatile storage module of claim 11, wherein the bridge device is further configured to correct errors encountered during the reading of the data.

14. The non-volatile storage module of claim 11, wherein the bridge device is further configured to write the modified data with error correction metadata.

15. The non-volatile storage module of claim 11, wherein data in the non-volatile memory storage is stored in a data redundancy scheme and the bridge device is further configured to read and write data in accordance with a data redundancy scheme.

16. The non-volatile storage module of claim 15, wherein the read-modify-write command further comprises a second location in the non-volatile memory storage for storing at least a part of updated parity data, and wherein the bridge device is further configured to write updated parity data at least partially to the second location.

17. The non-volatile storage module of claim 11, wherein the read-modify-write command includes a plurality of modification data units and a plurality of locations specifying where the plurality of modification data units are to be inserted into the read data.

18. The non-volatile storage module of claim 11, wherein the first interface is ONFI.

19. The non-volatile storage module of claim 11, wherein the second interface is PCIe.

20. A method for reducing data latency for a read-modify-write operation in a controller architecture comprising a controller device and a bridge device coupled with non-volatile solid-state memory storage, the method comprising performing by the bridge device:

receiving a first command from the controller device, the first command comprising a first location of parity data in the non-volatile memory storage and modification data;

receiving a second command from the controller device, the second command instructing the bridge device to accumulate parity data in connection with processing the first command; and processing the first command, the processing comprising:
reading data from the non-volatile memory storage, wherein reading the data comprises performing error correction in response to detecting an error in the data;

modifying the read data with the modification data to generate modified data;

creating updated parity data based at least in part on the modification data and the parity data stored at least partially in the first location, wherein creating the updated parity data is performed by the bridge device without transferring the parity data and the updated parity data to the controller device;

writing the modified data to the non-volatile memory storage; and writing the updated parity data to the non-volatile memory storage without receiving an additional command from the controller device, the additional command directing the bridge device to write the updated parity data, whereby latency is reduced due to performance of the read-modify-write operation without transfer of the read data from the bridge device to the controller device.

21. The method of claim 20, wherein the first command and modification data are received in the first command.

* * * * *